(12) United States Patent
Thiot

(10) Patent No.: US 7,141,898 B2
(45) Date of Patent: Nov. 28, 2006

(54) GAS-COOLED GENERATOR

(75) Inventor: Denis Thiot, Belfort (FR)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 10/667,327

(22) Filed: Sep. 23, 2003

(65) Prior Publication Data

US 2004/0084976 A1 May 6, 2004

(30) Foreign Application Priority Data

Sep. 26, 2002 (GB) .................................. 0222406.1

(51) Int. Cl.
*H02K 9/08* (2006.01)
*H02K 1/20* (2006.01)
*H02K 1/32* (2006.01)
(52) U.S. Cl. .............................. 310/55; 310/58; 310/61; 310/60 A
(58) Field of Classification Search ................. 310/52, 310/55–59, 60 A, 60 R, 61
See application file for complete search history.

(56) References Cited

U.S. PATENT DOCUMENTS

| | | | | |
|---|---|---|---|---|
| 1,546,234 A | * | 7/1925 | Hannah ...................... | 310/55 |
| 1,686,027 A | * | 10/1928 | Newbury ..................... | 310/55 |
| 2,078,164 A | * | 4/1937 | Savage ........................ | 310/55 |
| 2,186,232 A | * | 1/1940 | Baudry ....................... | 310/55 |
| 2,920,219 A | * | 1/1960 | Beckwith ..................... | 310/55 |
| 3,348,081 A | * | 10/1967 | Willyoung .................... | 310/55 |
| 3,643,119 A | * | 2/1972 | Lukens ....................... | 310/60 R |
| 3,702,964 A | * | 11/1972 | Kudlacik et al. .............. | 322/59 |
| 3,751,699 A | * | 8/1973 | Gleichman ................... | 310/90 |
| 3,816,751 A | * | 6/1974 | Jampen et al. ................. | 290/2 |
| 3,969,643 A | * | 7/1976 | Sapper ........................ | 310/53 |
| 4,348,604 A | * | 9/1982 | Thode ........................ | 310/62 |
| 4,845,394 A | * | 7/1989 | Kleinhans .................... | 310/64 |
| 4,904,890 A | * | 2/1990 | Archibald et al. ............. | 310/59 |
| 5,939,805 A | * | 8/1999 | Vanduyn ...................... | 310/58 |

FOREIGN PATENT DOCUMENTS

| | | |
|---|---|---|
| GB | 690 537 | 4/1953 |
| GB | 724 875 | 2/1955 |
| GB | 731 299 | 6/1955 |
| GB | 1 170 754 | 11/1969 |
| GB | 2 166 909 A | 5/1986 |

OTHER PUBLICATIONS

Search Report from GB 0222406.1 (Apr. 9, 2003).

\* cited by examiner

*Primary Examiner*—Burton Mullins
(74) *Attorney, Agent, or Firm*—Cermak & Kenealy, LLP; Adam J. Cermak

(57) ABSTRACT

Gaseous coolant, preferably helium, flows from coolers 12 past the winding overhangs 7 of the stator 3, then through cooling channels in the rotor 1, then into the rotor/stator gap 4, then through cooling ducts in the stator core 6 into a coolant receiving region 11, and then through the coolers 12. The coolant flow is preferably caused solely by the rotor auto-ventilation effect.

14 Claims, 5 Drawing Sheets

GAS-COOLED GENERATOR

BACKGROUND OF THE INVENTION

1. Field of the Invention

This invention relates to a gas-cooled generator, in particular a generator forming part of a turboset.

2. Brief Description of the Related Art

Generators are known which comprise a rotor and stator with a gap between them. The stator comprises a core and windings which form a winding overhang at each end of the stator. The rotor has axially extending cooling channels communicating with end portions of the rotor beyond ends of the stator core and has radially extending cooling channels communicating between the axially extending cooling channels and the said gap. The stator core has cooling ducts communicating between the said gap and a region for receiving gaseous coolant outside the stator core; the generator further comprises cooling apparatus communicating with the said receiving region.

In some known generators, the rotor, stator, and cooling apparatus are in an enclosure filled with the gaseous coolant, which is driven through the cooling apparatus by fans mounted on the ends of the rotor. From the cooling apparatus separate streams of gaseous coolant under pressure flow to the stator and to the rotor. In the stator the gaseous coolant flows radially inwards or outwards or alternately inwards and outwards.

Such generators suffer from losses due to the driving of the fans and friction of the gaseous coolant.

SUMMARY OF THE INVENTION

The present invention provides a generator comprising a rotor and stator with a gap between them, with baffles at the respective ends of the said gap, the rotor and stator being in a substantially hermetically sealed enclosure filled with a gaseous coolant at superatmospheric pressure, the stator comprising a core and windings which form a winding overhang at each end of the stator, wherein, when the generator is operating, gaseous coolant flows in a circuit from cooling apparatus past the winding overhangs, then through cooling channels in the rotor, then into the said gap, then through cooling ducts in the stator core into a coolant receiving region, and then through the cooling apparatus, the baffles both inhibiting escape of the gaseous coolant from the ends of the said gap and inhibiting entry of the gaseous coolant into the gap through its ends, the flow of gaseous coolant around the said cooling circuit being caused solely by the centrifugal force acting on the gaseous coolant in the cooling channels of the rotor.

BRIEF DESCRIPTION OF THE DRAWINGS

The invention will be described further, by way of example only, with reference to the accompanying drawings, in which.

DESCRIPTION OF THE PREFERRED EMBODIMENTS

Figure 1:
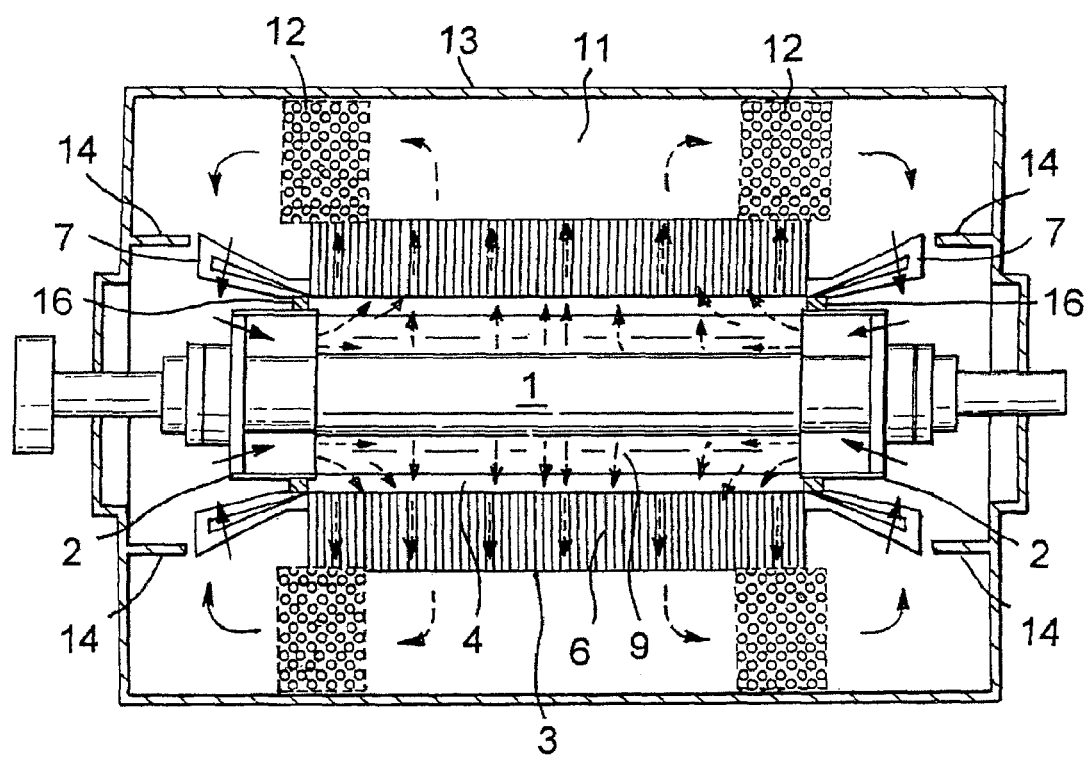
FIG. 1 is a schematic axial section through a first embodiment of a generator according to the invention.
Figure 2:
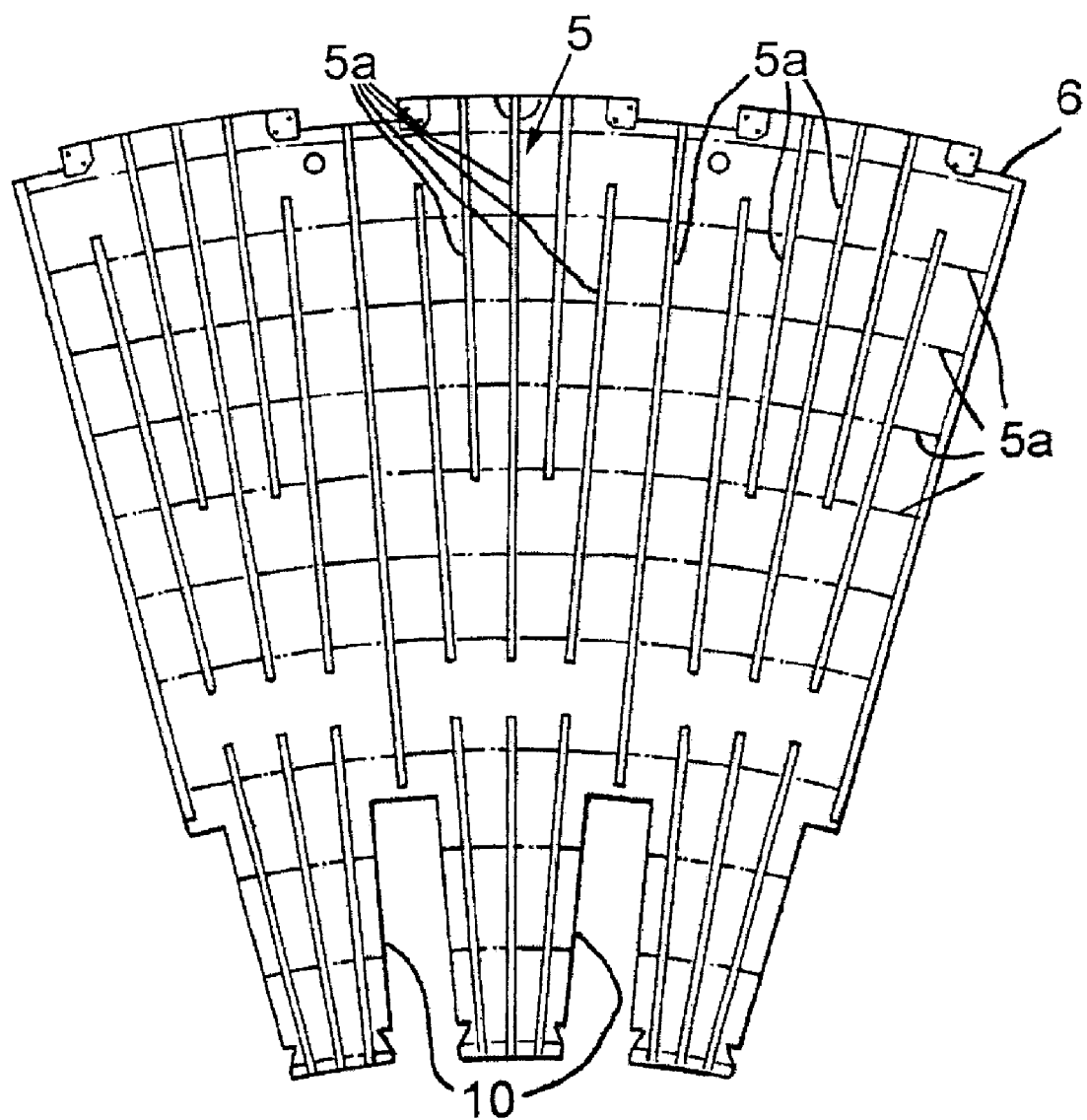
FIG. 2 is a partial transverse cross-section through the stator core of the generator.
Figure 3:
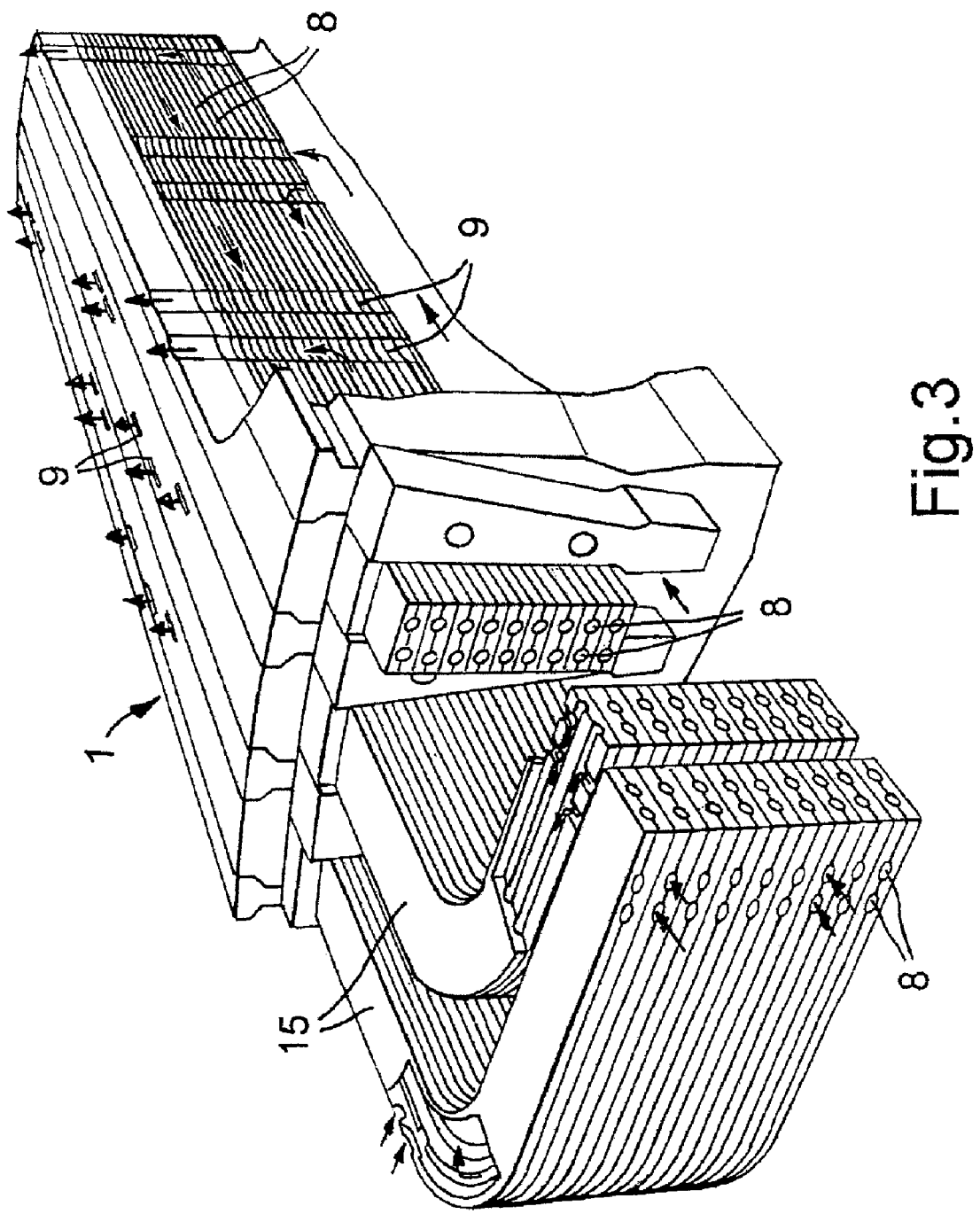
FIG. 3 is a fragmentary perspective view of part of one end of the rotor of the generator.
Figure 4:
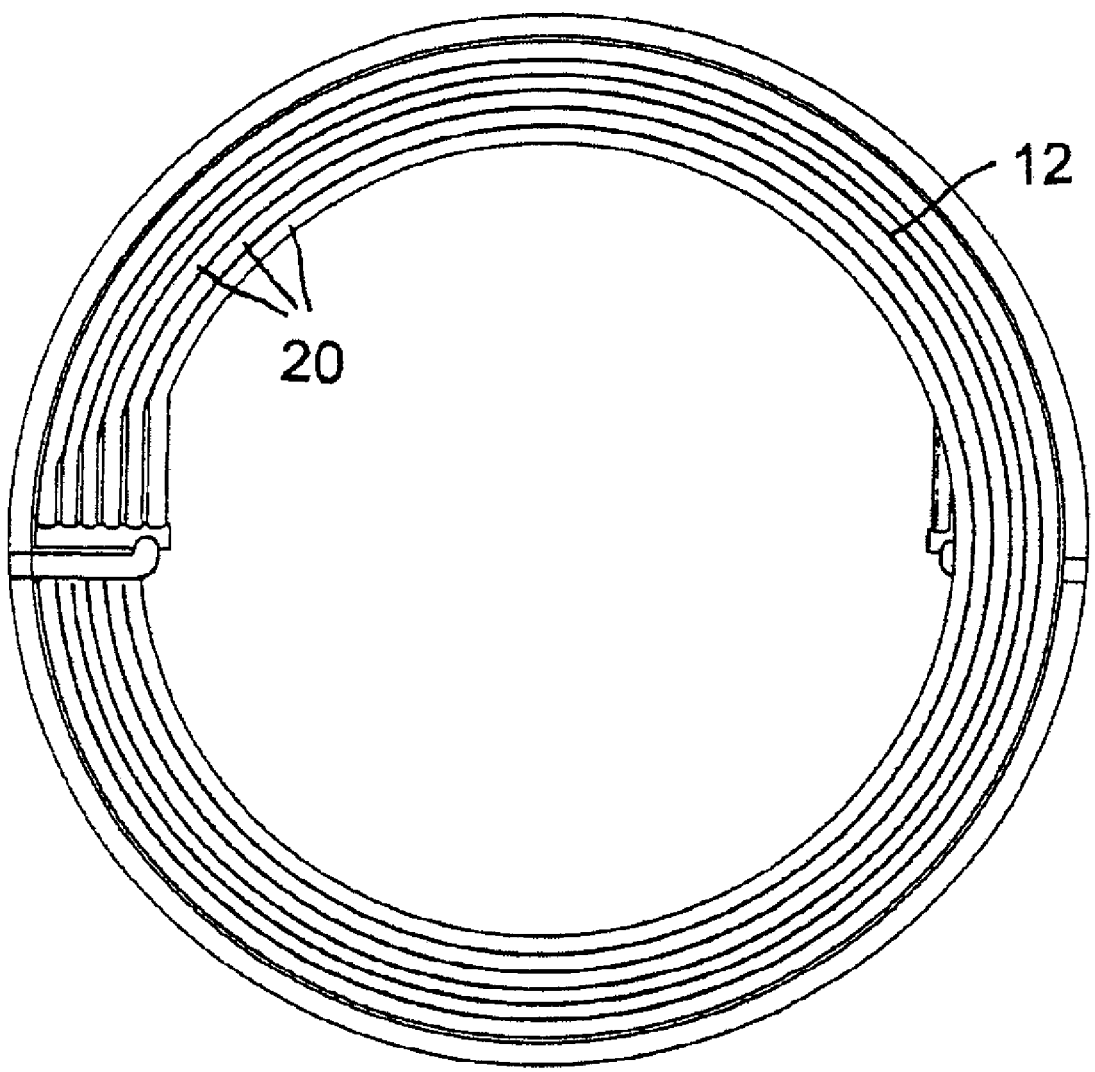
FIG. 4 is an elevation of a cooler used in the generator.

Referring to the drawing figures, like reference numerals designate identical or corresponding elements throughout the several figures.

In the generator shown in FIGS. 1 to 4, a rotor 1 is mounted for rotation about an axis (in this example a horizontal axis), the rotor being rotated by a turbine (not shown) when the generator is operating. The rotor 1 includes a cylindrical body with axial slots containing conducting bars 15, the bent ends of which are contained in winding heads 2 at respective ends of the rotor 1. The rotor 1 is surrounded by a stator 3, with a gap 4 between them. The stator 3 includes a core 6 made up of laminated core units and provided with radial ducts 5 which extend from the gap 4 to the outer circumferential surface of the core 6 and which are delimited by radial spacers 5a.

The inner circumferential surface of the core 6 has axial slots 10 containing windings which form a winding overhang 7 at each end of the stator 3. The rotor 1 has axial channels 8, which communicate with the winding heads 2, and radial channels 9, which communicate between the bottom of the axial slots 10 and the gap 4 and are distributed over the whole length and circumferential extent of the rotor. The radial channels 9 intersect the axial channels 8.

In operation, when the rotor 1 is rotated rapidly, for example by a gas turbine, a steam turbine, or a helium expansion turbine, a gaseous coolant in the channels 8,9 and slots 10 of the rotor 1 is subjected to a considerable centrifugal force which drives the gaseous coolant out of the radial channels 9, into the gap 4 and thence into the radial ducts 5 of the stator 3. From the ducts 5 the gaseous coolant flows into a receiving region 11 which surrounds the core 6 and is bounded by a substantially hermetic enclosure 13 which surrounds the rotor 1 and stator 3 and is filled with the gaseous coolant, which is preferably under superatmospheric pressure. The enclosure 13 contains two annular coolers 12 comprising parallel pipes 20 in which a cooling fluid circulates.

Thus the auto-ventilation effect of the rotor 1 causes the gaseous coolant to flow in the two symmetrical circuits that are indicated by arrows in FIG. 1. It is to be noted that solid arrows generally indicate cool gas at reduced pressure and broken arrows generally indicate warm gas at elevated pressure. Firstly, leaving the coolers 12 (in which the warm gas is cooled in a conventional way, by indirect heat exchange) the cold gaseous coolant flows past the winding overhangs 7 of the stator 3; baffles 14 are arranged so that most or all of the coolant flows between the winding overhangs. Subsequently, the coolant is sucked into the axial channels 8 of the rotor 1 through the ends of the winding heads 2 and into the slots 10, under the windings. After having cooled the rotor 1, the coolant is blown from the radial channels 9 into the gap 4 and through the radial ducts 5. Thus the hot gaseous coolant reaches the receiving region 11, from which it passes again through the coolers 12.

To inhibit escape of the gaseous coolant from the gap 4, baffles 16 are arranged at opposite ends of the gap 4.

Figure 5:
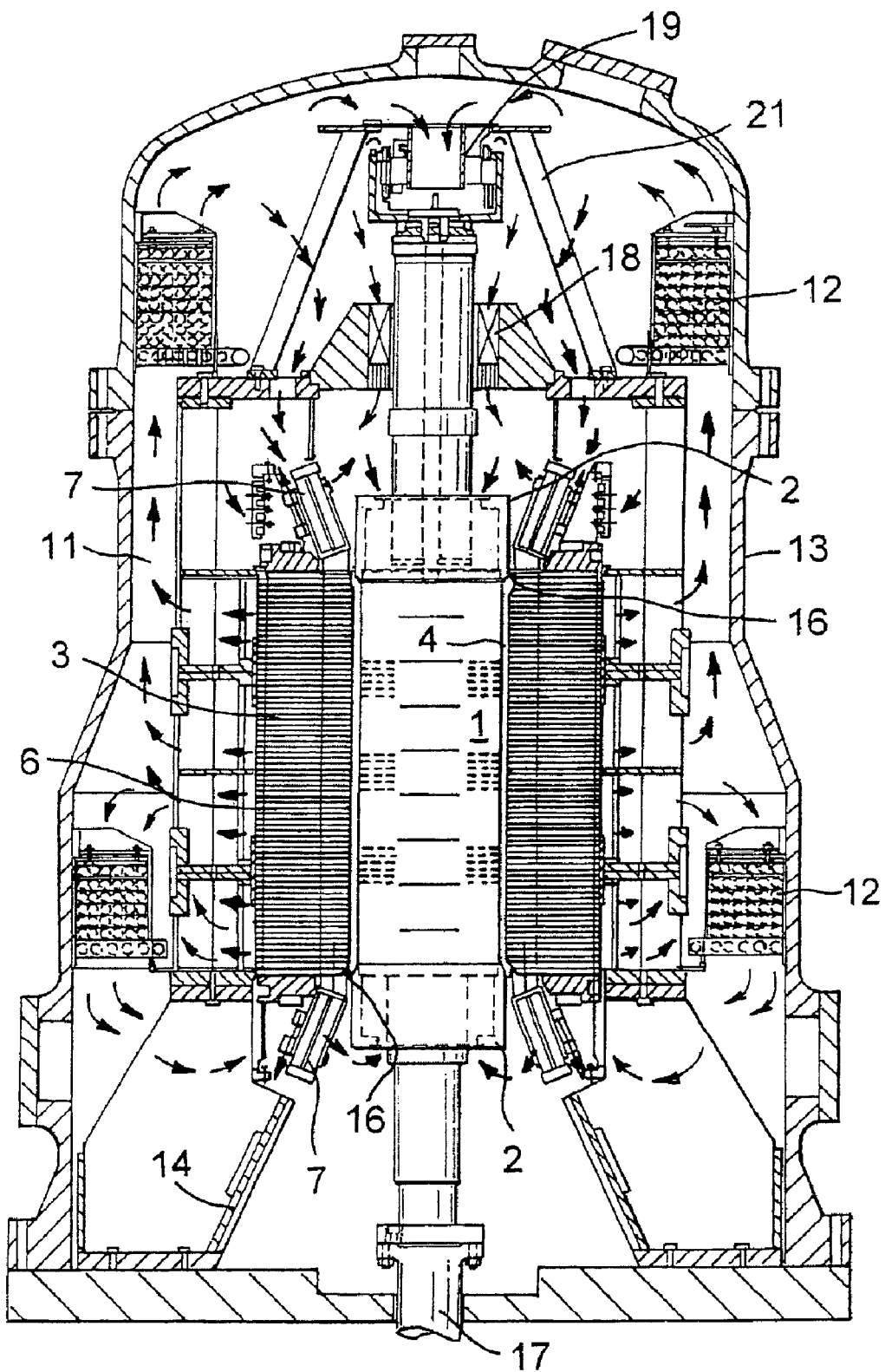
FIG. 5 is a schematic axial section through a second embodiment of the generator.

A preferred embodiment of the generator is shown in FIG. 5. Only major differences from the first embodiment will be described, and similar parts are given the same reference numerals. The rotor 1 is mounted with its axis vertical, its lower end being supported by the output shaft 17 of the turbine (not shown) below, and its upper end being supported by a magnetic bearing 18. The upper end of the rotor, above the bearing 18, is connected to an exciter 19 supported by a frame 21.

The gaseous coolant leaving the upper cooler 12 flows partly past the exciter 19 and partly past the bearing 18. Part of the flow passes through the bearing 18 to the upper winding head 2 of the rotor 1, but most of the flow is conducted over the upper winding overhangs 7 before reaching the upper winding head 2. The circulation of the gaseous coolant is indicated in general terms by the arrows in FIG. 5.

By putting the maximum number of parts to be cooled in a serial arrangement the total gas flow rate can be reduced to a minimum value compatible with (a) the maximum temperatures allowed by the materials used, industry standards, and contract specifications and (b) avoiding the risk of unequal distribution of the flow through some parts of the generator, which may provoke insufficient heat transfer. Lowering the total gas flow rate can significantly reduce mechanical losses; this can be achieved by ensuring that the density and, hence, the heat capacity of the gaseous coolant are high enough to keep the temperature rise reasonable all along the cooling circuit.

The use of the rotor auto-ventilation effect, without any fan, also reduces mechanical losses.

In the embodiments described above the preferred gaseous coolant is pure helium. This gas has a very high specific heat capacity if the mean pressure in the enclosure 13 is high, for example of the order of tens of bars, typically 10 to 50 bar. Furthermore, a minimum pressure of, for example 10 to 20 bar is preferred, to keep the helium dielectric properties good enough to be compatible with conventional insulating distances Serial flow allows one to derive the greatest benefit from the use of helium.

Various modifications may be made without departing from the scope of the invention. For example, another noble gas or, indeed, any suitable gas (e.g. nitrogen) or mixture of gases (e.g. air) providing sufficient cooling and dielectric properties may be used instead of helium. The coolers 12 may be of any convenient type and may be arranged at any convenient locations in the enclosure 13 to provide sufficient cooling. Instead of the coolers 12 in the enclosure 13, one or more coolers could be arranged outside the enclosure 13 and connected to the receiving region 11 and the end regions of the enclosure by suitable conduits. Although it is not preferred, fans could be provided to assist the flow of gaseous coolant through the cooler(s). Other rotor constructions than that illustrated in FIG. 3 could of course be used.

What is claimed is:

1. A generator comprising:
    a rotor and stator with a gap between the rotor and the stator, the gap having ends;
    baffles at the ends of the gap;
    a substantially hermetically sealed enclosure filled with a gaseous coolant at superatmospheric pressure and including a coolant receiving region, the rotor and the stator positioned in the enclosure, and wherein no fan is located in the enclosure;
    the stator including a core, cooling ducts in the stator core, and windings which form a winding overhang at each end of the stator, the rotor including cooling channels;
    wherein, when the generator is operating, and when the generator is in fluid communication with a cooling apparatus, gaseous coolant flows in a circuit from the cooling apparatus at least partially through the winding overhangs, then through cooling channels in the rotor, then into said gap, then through the cooling ducts in the stator core into the coolant receiving region, and then through the cooling apparatus, the baffles configured and arranged to both inhibit escape of the gaseous coolant from the ends of said gap and inhibit entry of the gaseous coolant into the gap through the gap ends, the flow of gaseous coolant around said cooling circuit being caused solely by centrifugal force acting on the gaseous coolant in the cooling channels of the rotor when said rotor rotates.

2. A generator as claimed in claim 1, further comprising:
    a cooling apparatus in fluid communication with the generator for cooling said gaseous coolant.

3. A generator as claimed in claim 2, in which the cooling apparatus is positioned within the enclosure.

4. A generator as claimed in claim 2, wherein the coolant receiving region has two ends, and wherein the cooling apparatus comprises at least one cooler at each end of said coolant receiving region.

5. A generator as claimed in claim 1, wherein the superatmospheric pressure is at least 10 bar.

6. A generator as claimed in claim 1, wherein the gaseous coolant comprises a noble gas.

7. A generator as claimed in claim 6, wherein the gaseous coolant comprises helium.

8. A generator as claimed in claim 1, wherein the rotor comprises end portions which extend beyond the stator core, and wherein the rotor cooling channels comprise:
    axially extending cooling channels communicating with the end portions of the rotor; and
    radially extending cooling channels communicating between the axially extending cooling channels and said gap.

9. A generator as claimed in claim 1, wherein the stator core comprises radially extending cooling ducts each communicating between said gap and the receiving region outside the stator core.

10. A generator as claimed in claim 1, further comprising:
    a bearing supporting the rotor; and
    wherein part of the flow from the cooling apparatus flows past the bearing when the generator is connected to cooling apparatus.

11. A generator as claimed in claim 1, further comprising:
    an exciter; and
    wherein part of the flow from the cooling apparatus flows past the exciter when the generator is connected to cooling apparatus.

12. A generator as claimed in claim 1, wherein the rotor axis is vertical.

13. A generator as claimed in claim 1, wherein the baffles are configured and arranged to direct substantially all of the coolant between the winding overhangs.

14. A generator as claimed in claim 1, wherein the baffles comprise baffles extending towards said winding overhangs to direct coolant towards the winding overhangs.

* * * * *